Aug. 18, 1936.   G. W. BATCHELL   2,051,238
SHIELD FOR GLASS TANK FEEDING SHELVES
Filed March 22, 1929
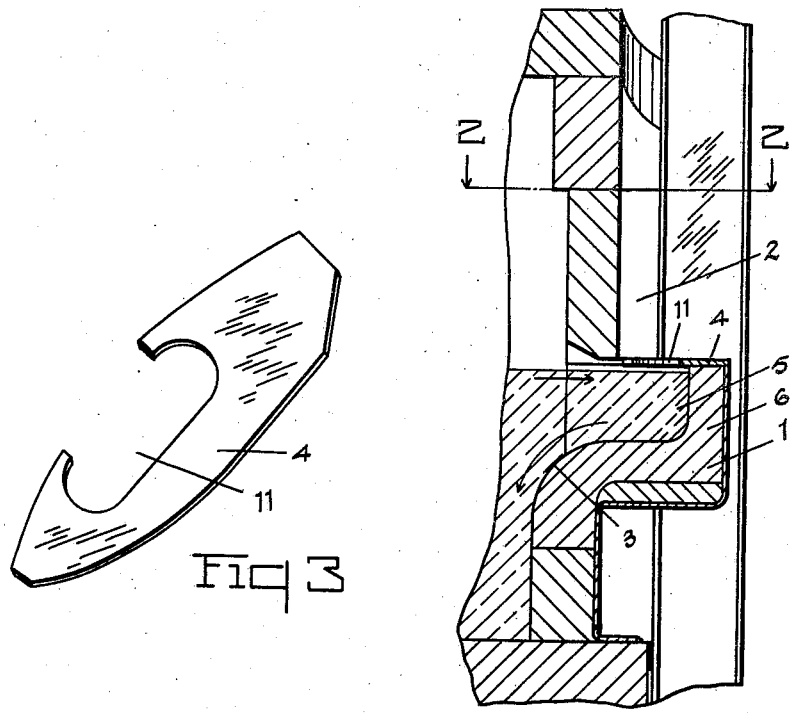
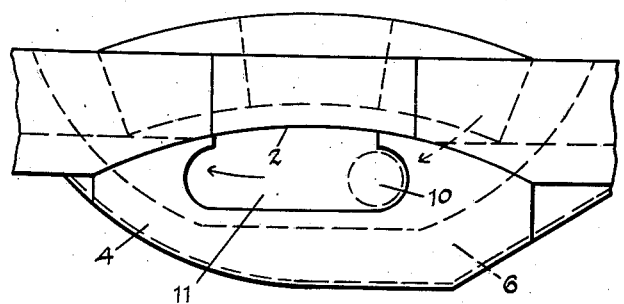
Inventor
George W. Batchell
By ____ Crampton
Attorney Patented Aug. 18, 1936

2,051,238

UNITED STATES PATENT OFFICE 2,051,238

SHIELD FOR GLASS TANK FEEDING SHELVES

George W. Batchell, Toledo, Ohio, assignor to Owens-Illinois Glass Company, a corporation of Ohio Application March 22, 1929, Serial No. 349,014

5 Claims. (Cl. 49—56)

My invention has for its object to provide a means for maintaining glass at a substantially uniform high workable temperature within the glass delivery shelves of glass tanks. As is well known in connection with glass forming apparatus, a glass mold, or blank, or dispensing container, is introduced into the molten glass of the glass tank and glass drawn or forced into the mold or container, by suction or by static pressure, and then the loaded blank or container is withdrawn. Usually a plurality of molds are supported on a rotary machine and are successively swung over a shallow shelf located so as to receive glass from the body of the tank and the molds or blanks are dipped into the glass contained in the shelf and the glass is drawn into the molds by suction. Owing to the fact that the glass within the shelf is ordinarily exposed to atmospheric air currents and the shelf protrudes from the body of the tank, the glass within the shelf is liable to chill and produce imperfect operations of the forming machine and consequently, imperfect glass articles. Also, the character of the glass ordinarily changes as the operation continues due to the chilling produced by the molds entering the glass in addition to that produced by the exposed position of the shelf. Also, uniform chilling of the body of the glass within the shelf prevents free movement of the convection currents that exists within the body of the tank.

By my invention I provide a means for preventing surface chill of the glass in the shelf and thus enabling the free convection of the glass within the shelf from and to the body of the glass within the tank, and, by maintaining the desired fluidity, normal to the temperature of efficiently workable glass, the movement of the gathering blank or mold produces a wash or current within the glass of the shelf sufficient to carry the glass from the body of the tank into the shelf and at the same time to carry into the tank glass, that is slightly chilled by contact with, or by reason of, being in the vicinity of the gathering blank or mold, and also to carry into the tank the clipping from the blank which is commonly produced as the blank leaves the shelf.

The invention particularly provides a shield for covering the glass in the shelf that is in contact with the outer wall of the shelf which prevents chilling of this portion of the glass to such an extent as to enable free convection over the surface of the wall. The shield also covers the body portion of the glass on the shelf to maintain the desired fluidity in the glass and thus maintain continuity of the convection currents of the glass beneath its horizontal surface and along the wall of the shelf and also on the bottom of the shelf and into the body of the glass in the tank. By maintaining the fluidity of the glass in the shelf in the desired workable condition a substantially free movement of the glass is produced by the movement of the blank lengthwise of the shelf as the blank is dipped below the surface of the glass and moved along the shelf while it is being filled. The movement of the glass within the shelf that is thus induced by the movement of the blank operates to draw an abundance of glass from the tank into the shelf and also produces a current that carries the slightly chilled clipping into the body of the tank.

The invention may be contained in shields that vary in their details and, to illustrate a practical application of the invention, I have selected a structure that contains the invention as an example of such structures and shall describe the particular structure selected hereinafter. The shield selected for purposes of illustration is shown in the accompanying drawing.

Fig. 1 is a view of a vertical section of a part of the glass tank through the central part of the shelf. Fig. 2 is a view taken between one of the courses of the tank blocks as indicated by the line 2—2 indicated in Fig. 1. Fig. 3 is a perspective view of the particular shelf illustrated in the other figures.

Where rotary forming machines are used to remove the glass from the tank, the tank is provided with a plurality of shelves that protrude from the side of the tank so as to form shallow mouths that contain glass received from the tank and are so located that the gathering or receiving members of the glass machines may be inserted into the glass to gather the desired amounts of glass for the formation of the articles. In the form of construction shown in the drawing, the outer surface of the portion of the wall of the tank above the shelf is curved inwardly in order to enable the circular movement of the glass receiving member, such as, the glass molds or blanks in which the glass is formed in the operation of the machine. The shelf protrudes from this curved portion of the wall of the tank to enable the location of parts of the machine below the shelf and to enable the gathering of the glass from the tank by a vertically downward movement of each blank or mold from above the shelf and while the blank is being swung circularly on the axis of the machine.

The curved portion of the wall of the glass tank affords a clearance for the rotative movement of the gathering member of the machine and the shallow shelf, located substantially at the level of the glass within the tank, and affords a lip for enabling the gathering of the glass from the tank by the rotated blanks. In the particular form of construction shown, the substantially circular lip protrudes from the recessed part of the tank and in such a position that the blanks may be partially submerged in the molten glass of the shelf and thus enable them to gather the glass from the tank by suction.

In the particular form of construction shown, the shelf 1 is located in the curved part 2 of the wall of the tank. The bottom of the shelf is, preferably, curved downwardly as at 3, in order to enable free movement of the molten glass produced by convection from within the shelf. The convected currents, as is well known, is produced by the cooling of the glass at the walls of the tank which produces a higher specific gravity than the average of the liquid glass which causes its descent at the walls, the hotter glass moving from the center of the tank towards the wall to replace that which descends.

Where a shelf is used for direct feeding glass from the glass tanks to the glass machines, the glass within the shelf is liable to be chilled for the reason that the surface of the glass is exposed to the atmosphere exterior to the tank, while the glass within the tank is exposed to the heat of the flame of the tank burner. The chilling of the glass within the shelf is also caused by reason of the fact that the shelf protrudes from the body of the tank and thus the shelf itself is subjected to the cooling action of the exterior atmosphere somewhat in excess of the cooling that is produced on the walls of the tank. By reason of this excess chilling, the fluidity of the glass within the shelf materially decreases ordinarily, which prevents efficient operation of the glass forming machine or apparatus and causes production of a glass in the glass articles that varies from the quality of the glass that would be produced if the glass was withdrawn directly from the body of the tank. Where there is frree convection, as between the glass in the tank and the glass of the shelf, the fluidity of the glass within the shelf is substantially the same as that within the tank. The excess of cooling, which materially affects the fluidity of the glass within the shelf, is produced by the chilling of the glass, the glass top surface and that portion in contact with, or in the vicinity of, the outer vertical wall of the shelf.

In order to reduce the surface chilling in the body of the glass, I provide a plate 4, formed of a refractory metal and having a considerable thickness, such as of nicrom metal or the like alloy and having a thickness of one-half inch which is supported on the edge of the shelf, its under surface being located in close proximity to the surface or level of the glass in the tank and the shelf. Thus the hot glass moving from the interior of the tank moves to the wall of the shelf, such as to the part 5 located in proximity to the vertical wall 6 of the shelf, and thus prevents the increase of the volume of the chilled glass at the wall and, consequently, prevents a decrease below the desired fluidity of the glass within the shelf and also maintains a temperature of the surface of the glass within the shelf to near that of the temperature of the surface of the glass within the tank. Preferably, the curved portion 2, of the tank wall, located above the shelf, extends to a point substantially at a level with the upper edge of the wall 6 of the shelf and the plate 4 extends across the top of the shelf to the lower edge of that part of the curved portion 2 of the wall of the tank located above the shelf.

The glass receiving blank, or mold, is usually substantially cylindrical in form. It is indicated by the dotted circular line 10. The plate 4 is provided with an opening 11, or the plate 4 may be so formed that when in position on the shelf, it will form with the wall of the tank the opening 11. The blank or mold 10 draws glass from the tank by submerging a portion of the blank below the level of the glass as the blank is moved circularly about the axis of the machine and while the lower end of the blank is submerged below the level of the glass. The opening 11 is of a length sufficient to permit the movement of the blank 10 and as the blank is withdrawn, the glass that strings from it, is sheared or pinched from the blank at the end of the opening 11. Where the desired fluidity is maintained, in the glass in the shelf, the circular movement of the blank 10 within the glass, produces a movement of the glass within the shelf in a direction along the shelf which produces a flow of the glass from the tank into the shelf, particularly at the end where the blank is introduced into the glass and towards the end of the shelf where the blank is lifted from the shelf. This movement of the glass operates to wash or carry with it the clipping that is made as the blank leaves the shelf into the body of the tank and thus the glass that contacts with the exterior blank, or located in the vicinity of the blank, is carried into the hotter glass of the interior of the tank by the current that is thus produced. Thus the opening 11 is formed to have a width substantially the same as the diameter or the width of the blank 10 and a length substantially the same as that of the movement of the blank, while it is at or within the surface of the glass in the shelf, the shield 4 operating to cover the remainder of the area of the upper surface of the glass within the shelf. Thus, by my invention I have provided a means whereby surface chilling and excess wall chilling of the glass within the shelf is prevented which maintains the glass within the shelf at the desired fluidity and at the desired workable temperature.

I claim:

1. A tank for molten glass having a wall with a reentrant portion, a horizontally elongated opening formed in said reentrant portion, a shelf coextensive with said opening and extending outwardly from the bottom wall thereof, a wall extending upwardly from the outer extremity of said shelf to form a container for molten glass and terminating in substantially the same horizontal plane with the top wall of said opening, a cover plate of refractory metal for said container, the outer extremity of said cover plate conforming to the shape of said wall at the outer extremity of the shelf and in contact with the top portion of said last mentioned wall, and the inner extremity of said cover abutting and conforming to the shape of the top wall of said opening, and the cover plate having an oblong opening in said cover plate of less extent than said container.

2. In a shield for preventing the chilling of the surface of glass in a glass delivering shelf of a glass tank and from which glass is gathered, the tank having a side wall, the side wall having an opening, the shelf having a bottom wall extending laterally from the tank wall along the lower edge of the opening and a side wall extending upwardly to substantially the plane of the upper edge of the said opening, and forming a glass delivering container, a sheet refractory metal plate oblong in form and forming a cover plate substantially closing the container, the cover plate having an oblong opening extending lengthwise of the shelf in a direction extending along the lateral wall of the tank to enable gathering of glass by a sweeping movement along and through the opening.

3. A tank for molten glass having a wall with a reentrant portion, a horizontally elongated opening formed in said reentrant portion, a shelf coextensive with said opening and extending outwardly from the bottom wall thereof, a wall extending upwardly from the outer extremity of said shelf to form a container for molten glass and terminating in substantially the same horizontal plane with the top wall of said opening, a cover plate of refractory metal for said container supported by and resting upon the top portion of the upwardly extending wall, the inner extremity of said cover abutting and conforming to the shape of the top wall of said opening and the cover plate having an oblong opening therein of less extent than the container.

4. In combination, a container for a pool of molten glass, means for supplying molten glass thereto and a cover plate approximately one-half inch thick formed of refractory metal alloy and substantially closing the upper side of the container and spaced above the glass, said cover plate being formed with an elongated opening for the entry and withdrawal of a glass gathering implement.

5. In combination, a container for a pool of molten glass, means for supplying molten glass thereto and a cover plate approximately one-half inch thick formed of refractory nicrom metal alloy and substantially closing the upper side of the container and spaced above the glass, said cover plate being formed with an elongated opening for the entry and withdrawal of a glass gathering implement.

GEORGE W. BATCHELL.